United States Patent
Vackar

(10) Patent No.: US 6,524,743 B2
(45) Date of Patent: Feb. 25, 2003

(54) BATTERY CASE WITH ELECTRICAL CONNECTOR FOR TWO-DIMENSIONAL MOVEMENT

(75) Inventor: Mark A Vackar, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 09/794,114

(22) Filed: Feb. 28, 2001

(65) Prior Publication Data

US 2001/0012578 A1 Aug. 9, 2001

Related U.S. Application Data

(62) Division of application No. 09/140,548, filed on Aug. 26, 1998, now Pat. No. 6,197,444.

(51) Int. Cl.<sup>7</sup> ............................................... H01M 2/06
(52) U.S. Cl. ..................... 429/159; 99/163; 99/176; 99/100; 439/500
(58) Field of Search ............................. 429/158, 159, 429/99, 163, 176, 100; 439/500

(56) References Cited

U.S. PATENT DOCUMENTS

| | | | |
|---|---|---|---|
| 4,221,450 A | * | 9/1980 | Sears ........................ 429/100 |
| 4,593,461 A | | 6/1986 | Thiele et al. |
| 5,536,595 A | | 7/1996 | Inkmann et al. |
| 5,681,668 A | | 10/1997 | Reed et al. |
| 5,906,505 A | * | 5/1999 | McCurdy, Jr. et al. ...... 439/500 |
| 6,190,795 B1 | * | 2/2001 | Daley ........................ 429/100 |

* cited by examiner

Primary Examiner—John S. Maples
(74) Attorney, Agent, or Firm—Banner & Witcoff, LTD

(57) ABSTRACT

A battery case comprising a pair of case members joined together along a seam to form a housing. Each case member includes a pair of sidewalls adapted to define a base surface on which the case rests so as to permit a plurality of resting orientations of the battery case. The seam is positioned above the lowermost base surface of the casing to contain any leaked battery acid regardless of case orientation. Further, the battery case includes supports for supporting the lower surface of the battery above any leaked acid, as well as partitions that define a discrete cavity for each battery to isolate the battery from an adjacent battery that may be leaking. The battery case also includes an electrical connector mounted for two dimensional movement that facilitates completion of a blind and automatic connection of the battery case with a complementary connector.

16 Claims, 4 Drawing Sheets

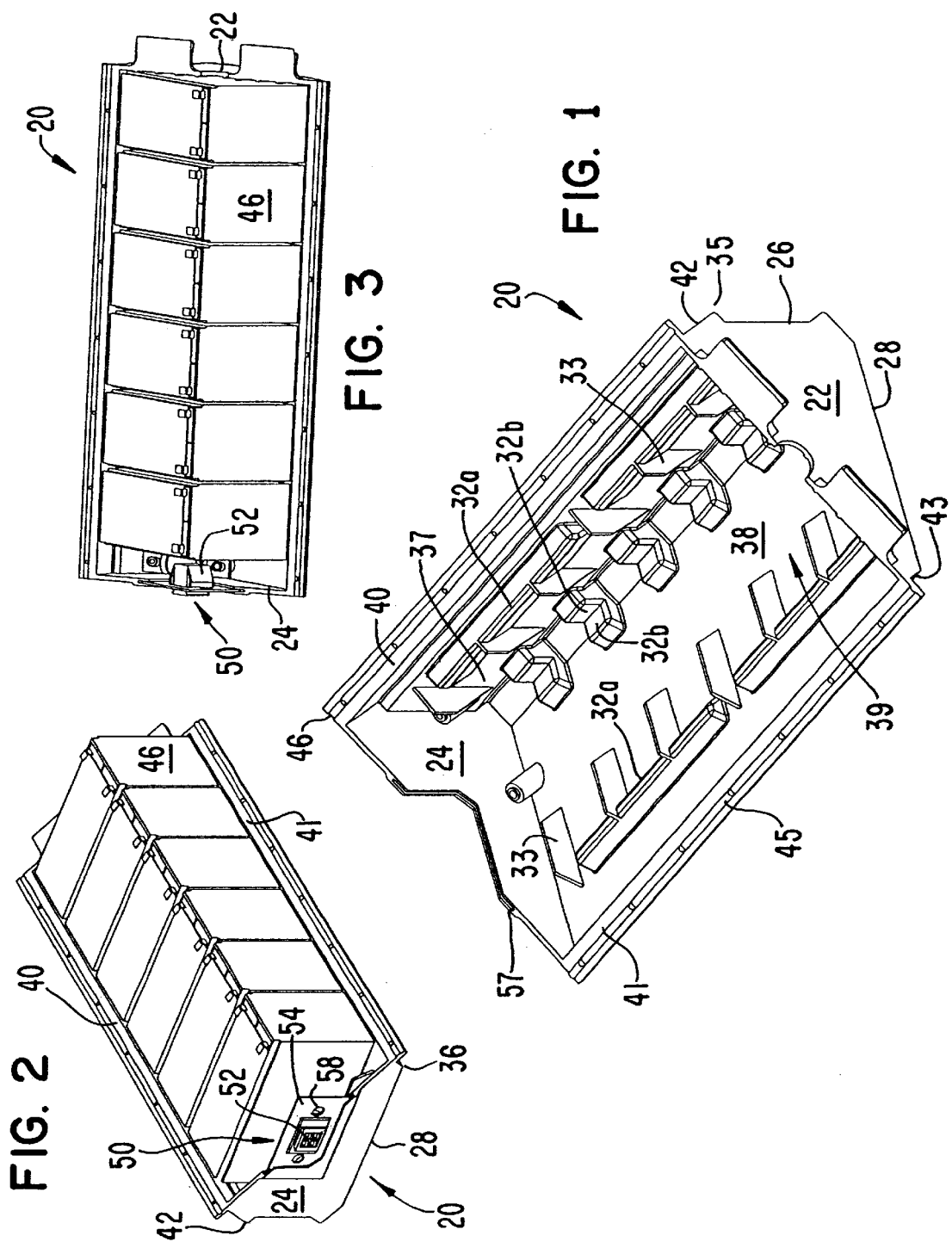

BATTERY CASE WITH ELECTRICAL CONNECTOR FOR TWO-DIMENSIONAL MOVEMENT

This is a divisional application of U.S. patent application, Ser. No. 09/140,548, filed Aug. 26, 1998 now U.S. Pat. No. 6,197,444.

FIELD OF TIE INVENTION

This invention relates to battery cases, and in particular to cases for use in an uninterruptible power supply.

BACKGROUND OF THE INVENTION

Uninterruptible power supplies (UPS) serve as back-up power supplies to critical electrical devices during outages of regular power supplies. The UPS is generally computer controlled and monitors the power supplied to the electrical device, switching on the back-up power supply if the normal power supply becomes insufficient. Therefore it is crucial that the UPS be reliable even after periods of minimal maintenance. AUPS typically draws its backup power from a set of lead-acid batteries connected in series and housed in a battery case. The battery cases are housed in a UPS cart with a front door that opens and allows the battery case to be slid into the cart and connected.

Current battery cases consist of a top piece and a bottom piece constructed of a non-conducting material, usually a heavy plastic. The bottom piece is divided into compartments by short fins, each compartment containing two or more batteries which have been adhered together. The batteries are wired in series and connected to an electrical connector mounted in an end panel of the bottom piece. The top piece is then secured to the bottom piece to form a generally rectangular container whose seam runs along the center of the container.

Battery cases provide for improved safety and handling of lead-acid batteries. As can be appreciated, lead-acid batteries pose hazards due to the possible leakage of acid contained within the battery. For example, acid leaked from a battery can cause short circuits and result in damage to equipment and an increased risk of fires. While conventional battery cases are able to contain leaked acid within the case when the case is positioned correctly on its bottom piece, the battery case during installation may be dropped or set down on a side having a seam through which the acid may leak. Conventional cases also do not effectively protect other batteries within the case from the leaked acid. The presence of the seam also limits the case to a single orientation within the UPS. Accordingly a different battery case has generally been required for each different style of UPS.

Further, the UPS electrical connections are located at the back of elongated narrow bays defined in the UPS cart for receiving the battery cases. The connection therefore has usually been made by hand with minimal space and poor lighting. Such a hand connection requires that the UPS be powered down to prevent injuries, thus defeating the purpose of a continuous backup power supply.

In an effort to eliminate manual coupling of the connectors, the connectors have been mounted on stiff springs for limited movement. The springs function to press the connector forward and thereby allow the connector members a limited amount of back and forth shifting in an effort to achieve coupling of the connectors when the battery cases are inserted. However, this type of adjustment has proven to be largely ineffective. To better align the connectors, the battery cases have been formed with guide members on their bottom surfaces for mating receipt in guiding grooves formed in the bays of the UPS shelves. However, connection is still difficult because of the stiffness of the springs and the weight of the cases, which can sometimes be over 100 pounds.

SUMMARY OF THE INVENTION

Accordingly, it is an object of the present invention to provide a battery case that contains acid leaks from lead acid batteries so as to eliminate short-circuits of the batteries and other acid related injuries to the user or equipment.

Another object of the present invention is to contain leaks of the battery regardless of the orientation of the battery case on different sidewalls to allow for a range of installation configurations and worry-free handling.

Another object of the present invention is to reduce the risk of electrical shocks during installation of the battery case by facilitating a blind electrical connection that obviates the need for handling the actual connectors in a difficult to reach place with poor lighting conditions.

A still further object of the invention is to achieve an easy automatic coupling of the connector when the battery case is inserted into a bay of a UPS.

In one aspect of the invention, a battery case comprises a pair of case members joined together to form a housing. Each case member includes a pair of sidewalls that serve not only to contain the batteries, but are also adapted to support the case. Each case member further includes a pair of transverse end walls interconnecting the sidewalls to form an enclosure about the batteries. The case members are joined along a seam which is above the sidewall forming the lowermost base wall for the casing so as to contain acid leaks within the casing.

In another aspect of the invention, the battery case comprises supports for supporting the battery above the interior surface of the lowermost base wall of the battery case, and partitions that define a discrete cavity for each battery. The supports and partitions guard against acid leaked from one battery contacting and affecting another adjacent battery.

In accordance with another aspect of the invention, each battery case includes a connector electrically connected to the batteries enclosed therein and a mount for attaching the connector that allows at least two-dimensional movement of the connector relative to the housing. One of the mount and connector further include a guide structure that cooperates with a guide structure of a complementary connector to facilitate electrical coupling of the connectors. The ability of the mount to have a two-dimensional freedom of movement and the use of guide structures enables an easy blind and automatic connection of the two connectors.

The above and other objects, features and advantages of the present invention will be readily apparent and fully understood from the following detailed description of preferred embodiments, taken in connection with the appended drawings.

BRIEF DESCRIPTION OF THE DRAWINGS

FIG. 1 is a perspective view of one-half of a symmetrical two-piece battery case in accordance with the present invention.

FIG. 2 is a perspective view of the one-half of a battery case shown in FIG. 1 with an electrical connector plate and lead-acid batteries installed.

FIG. 3 is a side perspective view of the case shown in FIG. 2.

DETAILED DESCRIPTION OF THE PREFERRED EMBODIMENTS

Figure 4:
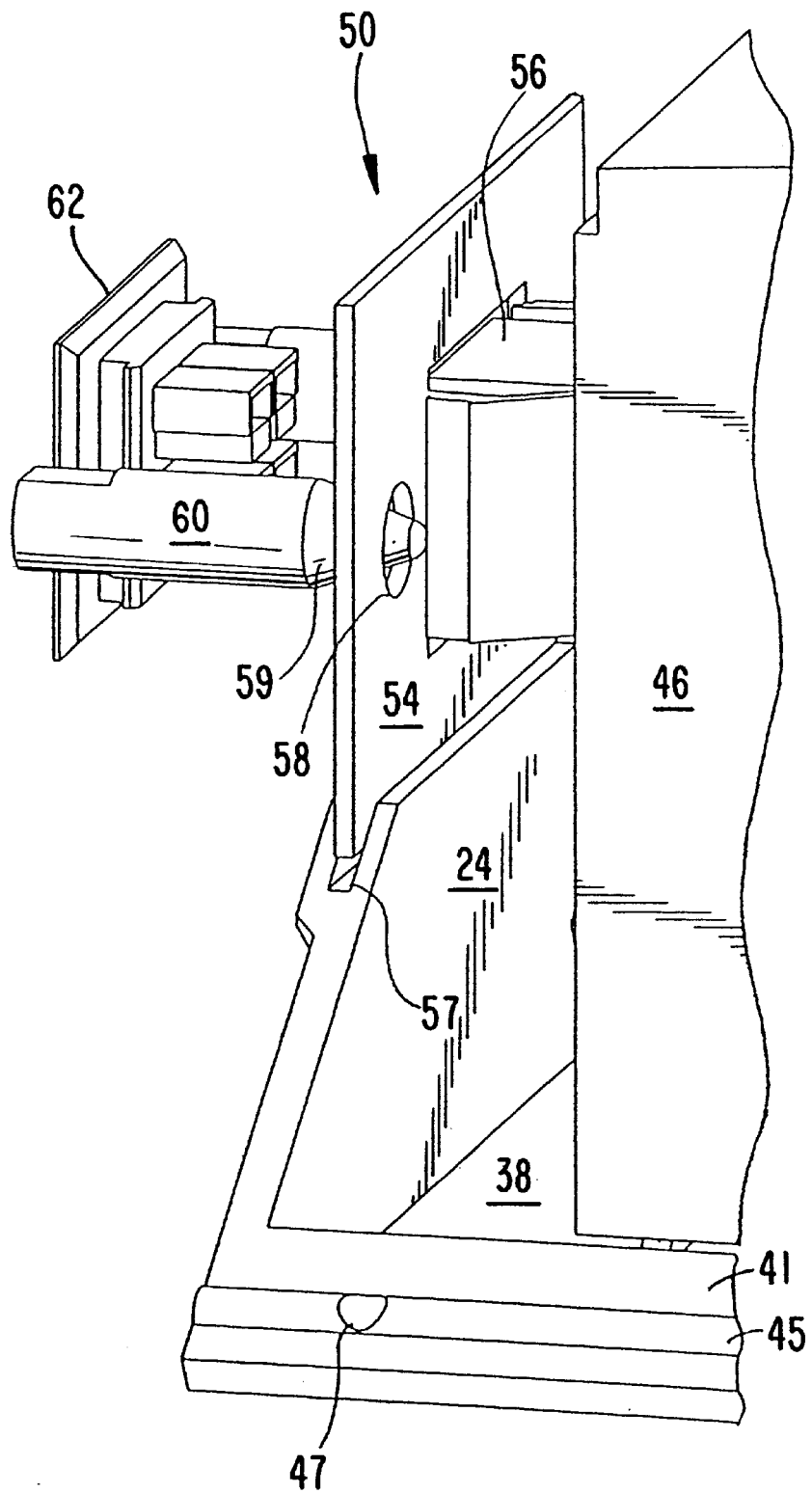
FIG. 4 is an enlarged fragmentary perspective view of one end of the case (with one-half omitted) with the connector plate receiving guides during installation in a UPS.
Figure 5:
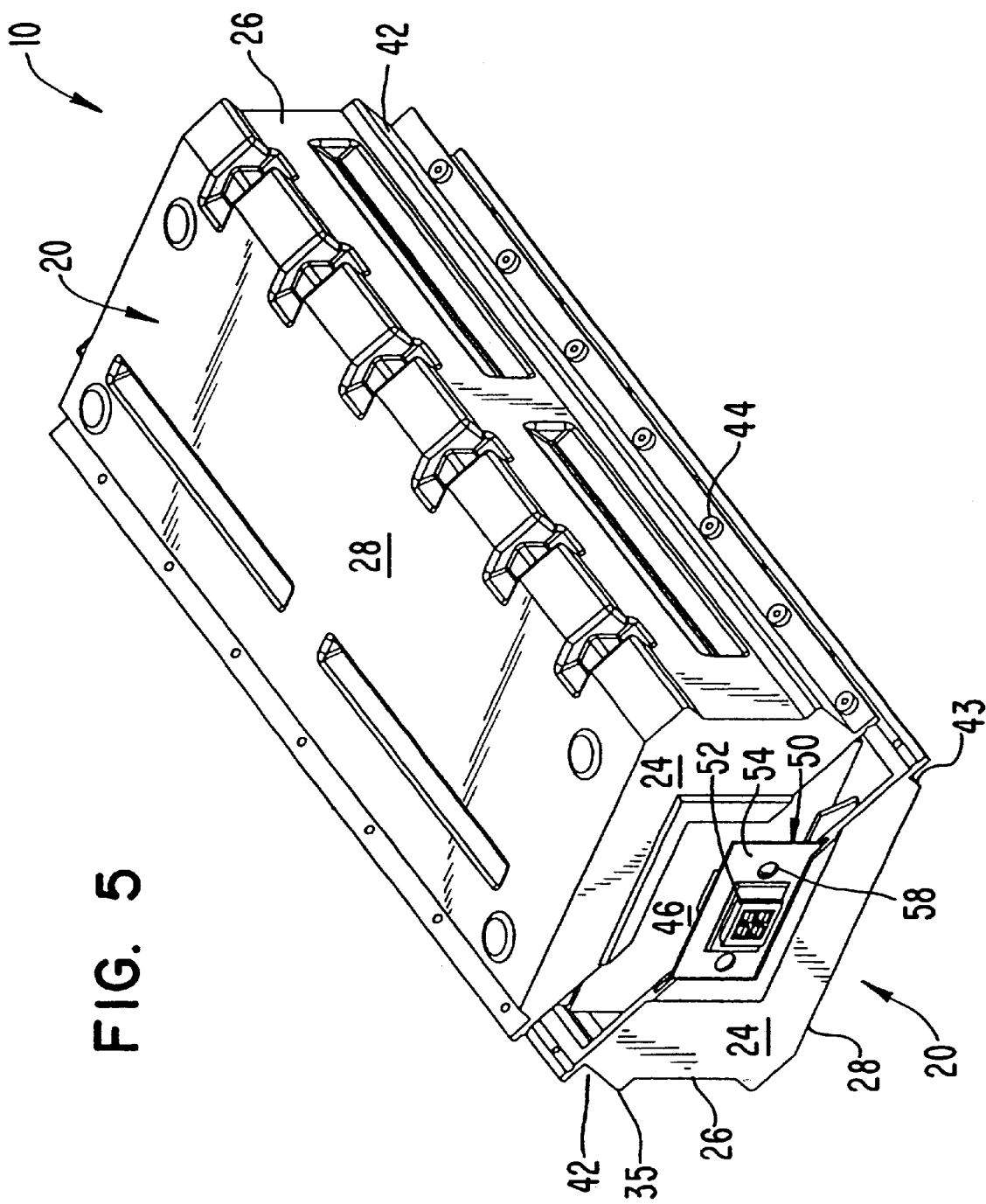
FIG. 5 is a perspective view of the battery case with second-half of the battery case being closed over the batteries mounted in the first half.
Figure 6:
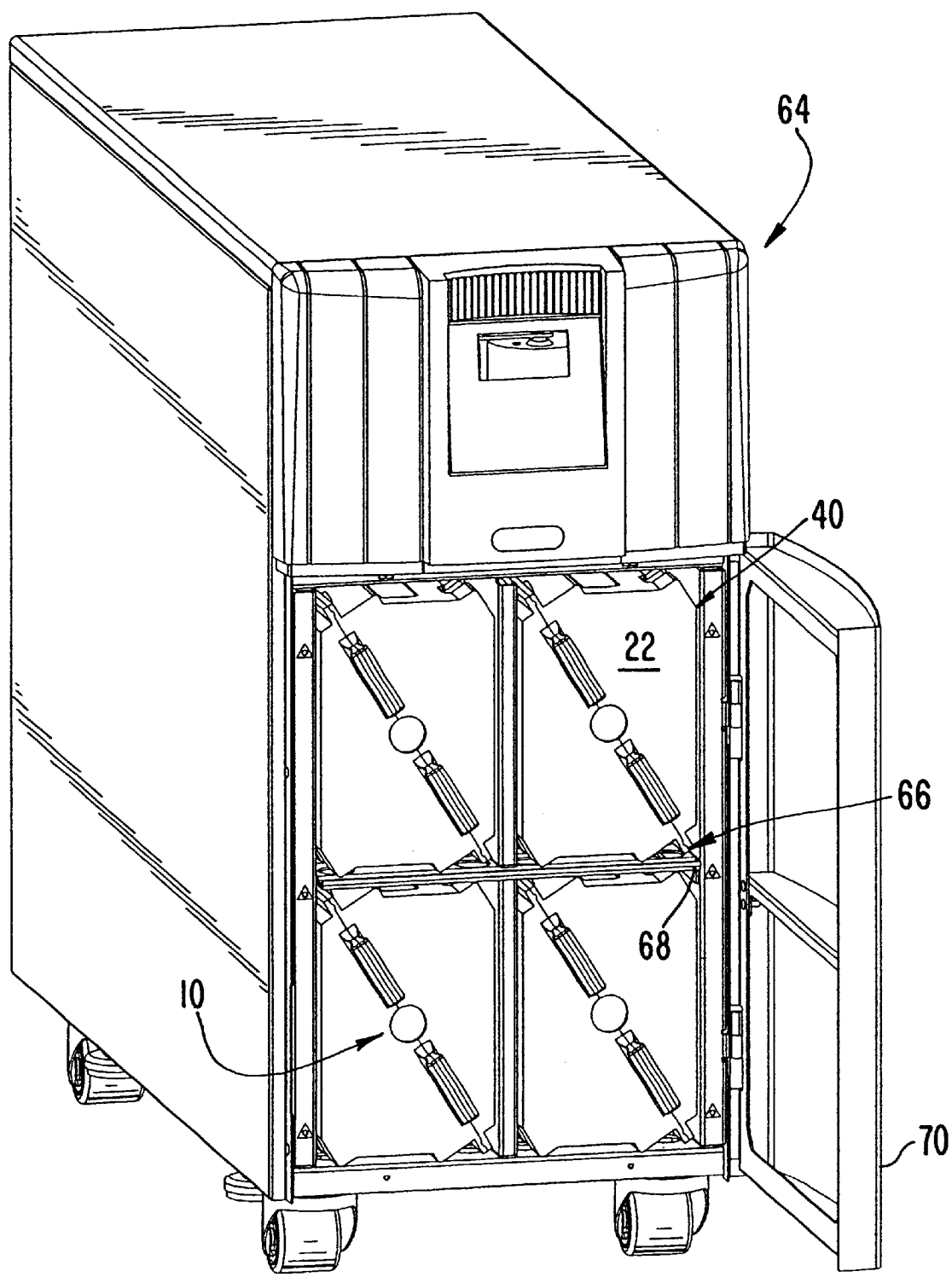
FIG. 6 is a perspective view of an uninterruptible power supply cart with the front door of the cart open, revealing four installed battery cases.

A battery case 10 in accordance with the present invention contains a plurality of electrically connected batteries to ease handling, contain leaks and facilitate enhanced connection during use. In a preferred embodiment, battery case 10 includes case members 20 that are interconnected to enclose and contain the batteries. Case members 20 are preferably identical for greater efficiency in manufacturing and greater ease of assembly; although differences could be incorporated in the case members if desired.

Each case member 20 includes a pair of sidewalls 26, 28 interconnected along one edge to define a generally v-shaped groove configuration. The sidewalls are joined at an angle of 90 degrees so as to form a generally rectangular container when the case members 20 are coupled together. Sidewall 28 is typically longer to accommodate the lengths of the batteries which are usually greater than their heights. Of course, the dimensions of the case members could vary depending on the size, shape and orientation of the batteries within the case. A pair of end walls 22, 24 interconnect sidewalls 26, 28 to form one-half of the enclosure. Sidewalls 26, 28 and end walls 22, 24 collectively define a case opening into which batteries 46 are placed during assembly.

The interior of each sidewall 26, 28 is provided with supports 32 and partitions 33. In the preferred construction, a first set of supports 32a, in the form of ridges, extend generally parallel to the outer edges 35, 36 of sidewalls 26, 28 to support an end of each battery. A second set of supports 32b, in the form of discrete blocks, are provided along the connection of sidewalls 26, 28 to support the other end of each battery. In this way, the batteries are spaced from the interior faces 37, 38 of the sidewalls 26, 28 so that any leakage of acid from the batteries flows onto the faces 37, 38 without contacting or affecting the other batteries.

More specifically, the battery case can be set so that either sidewall 26 or 28 defines the lowermost base wall for supporting the battery case. The provision of supports 32 on each face 37, 38 thus produce the same isolation effect from leaked battery acid. Of course, the supports 32 could be provided on only one face if the case were to be set in only one orientation. Moreover, the supports may have any shape or construction so long as the batteries are spaced from the interior faces of the sidewalls.

Batteries 46 are further isolated from each other by partitions 33. Partitions 33 are preferably formed as flanges upstanding from each face 37, 38 to define a discrete cavity 39 for each battery. In this way, a gap can be maintained between batteries so that leakage of acid from one battery does not contact an adjacent battery and cause a short-circuit or other damage. Partitions 33 may have varying heights, widths, lengths, and shapes so long as they isolate the batteries from each other.

A joining face 40, 41 is defined along the outer edge of each of the sidewalls 26, 28 for facilitating connection with the complementary case members. The joining faces 40, 41 are spaced from interior faces 37, 38 by joining walls 42, 43. In this way, the end walls 22, 24, face 37 or 38 and joining walls 42, 43 form a basin which collects and contains any acid which may leak from one or more of the batteries and prevent seepage of the acid through the seam when the two case members 20 are joined together. More specifically, if the case is supported on sidewall 26, the joining face 40 is spaced above face 37 by joining wall 42 and adjoining face 41 is spaced above face 38 by sidewall 28 and joining wall 43. Alternatively, if case 10 is supported on sidewall 28, the joining face 41 is spaced above face 38 by joining wall 43, and joining face 40 is spaced above face 38 by sidewall 26 and joining wall 42. Accordingly the seam is above the defined basin irrespective of which sidewall 26, 28 forms the lowermost base wall for the battery case. For additional assurance against acid leaking from the case, the joining faces are preferably provided with a mating tongue 45 and groove 46. Screws 44 are then received through holes 47 to secure the case members together. Nevertheless, case members 20 may be connected by other means such as sonic welding, riveting, gluing, etc.

An electrical connector assembly 50 for the battery case, as best illustrated in FIG. 4, is secured in end wall 24 of the housing. Connector assembly 50 preferably comprises an off-the-shelf electrical connector 52, known for UPS use, which is attached to a connector plate 54 to extend through a connector hole 56. The connector plate 54 is loosely supported in a peripheral groove 57 for free motion in two dimensions (i.e., an x-y type motion). One half of the groove 57 is formed in the end wall 24 of each case member 20. The connector assembly 50 has a guide structure. As seen in FIG. 4, connector plate 54 further has circular guide apertures 58 to receive guide pins 60 to shift and align the electrical connector 52 with the UPS mating connector 62 as necessary. The free ends 59 of guide pins 60 are tapered for guiding receipt into apertures 58. Other forms of complementary guides could also be used. The free movement of connector assembly 50 in end walls 24 enables the connector 52 to automatically connect with the connector 62 of the UPS cart. This automatic connection also allows for the battery cases to be "hot-swapped" (i.e., replaced) without shutting down UPS power.

The above described battery case 10 is especially suited for use in a UPS 64; although other uses are possible. UPS 64 typically has a front door 70 that opens to reveal bays 66 for insertion of the battery cases. Shelves 68 are provided in each bay to support the battery cases inserted therein. A completed battery case is lifted and slid end wall 24 first into bay 66 along shelf 68 until guide pins 60 engage guide apertures 58 and connector 52 is electrically coupled to connector 62.

The above discussion concerns the preferred embodiments of the present invention. Various other embodiments as well as many changes and alternatives may be made without departing from the spirit and broader aspects of the invention defined in the claims.

What is claimed is:

1. A battery case comprising a housing for containing a plurality of batteries, a connector electrically connected to said batteries, and a mount attaching said connector to said housing for at least two dimensional movement of said connector relative to said housing, one of said mount and connector further including a guide structure to cooperate with a guide structure of a complementary connector to ease electrical coupling of the connector with the complementary connector.

2. A battery case in accordance with claim 1 in which said mount is supported in an end wall of said housing for free movement in directions generally parallel to said end wall.

3. A battery case in accordance with claim 1 in which said housing includes a peripheral groove for movably receiving outer edges of said mount.

4. A battery case in accordance with claim 2 in which said mount is freely movable in two dimensions within predetermined limits within said groove.

5. A battery case in accordance with claim 1 in which said guide structure of said connector includes at least one aperture adapted to receive a guide pin.

6. A battery case in accordance with claim 1 in which said housing includes a pair of case members assembled together to define a generally rectangular housing.

7. A battery case in accordance with claim 5 in which said case members are joined along a seam, wherein longitudinal portions of said seam are generally located in opposite corners of the housing.

8. A battery case comprising a housing for containing at least one battery, a connector for electrically connecting to the at least one battery, and a mount attaching the connector to the housing for at least two dimensional movement of the connector relative to the housing to ease the coupling of the connector of a complementary connector.

9. The battery case in accordance with claim 8, in which the mount is supported in an end wall of the housing for movement in directions generally parallel to the end wall.

10. The battery case in accordance with claim 8, in which the housing includes a groove for movably receiving outer edges of the mount.

11. The battery case in accordance with claim 8, in which the housing includes a pair of case members assembled together to defined a generally rectangular housing.

12. A battery case comprising a housing for containing a plurality of batteries, a connector adapted to electrically connect to the plurality of batteries; and the housing defining a space in which the connector is received and including a mounting structure that movably supports the connector for two dimensional movement within the space to ease the coupling of the connector of a complementary connector.

13. The battery case in accordance with claim 12, wherein the mounting structure includes a plurality of grooves about the space and the connector includes a projecting portion movably received within the grooves.

14. The battery case in accordance with claim 13, wherein the connector includes a connector housing and a connector plate fixedly attached together, and the connector plate defines the projecting portion.

15. The battery case in accordance with claim 13, further including a guide structure in the connector plate.

16. The battery case in accordance with claim 14, wherein the housing further includes a pair of case members having end walls which are adapted to matingly engage to form the space for the connector.

* * * * *